United States Patent [19]

Porter

[11] 4,256,683
[45] Mar. 17, 1981

[54] HEAT TREATMENT OF WINDSHIELD WIPER BLADES

[75] Inventor: Raymond P. Porter, North Dartmouth, Mass.

[73] Assignee: Acushnet Company, New Bedford, Mass.

[21] Appl. No.: 972,480

[22] Filed: Dec. 22, 1978

Related U.S. Application Data

[63] Continuation of Ser. No. 815,521, Jul. 14, 1977, abandoned.

[51] Int. Cl.³ .............................................. B29C 25/00
[52] U.S. Cl. ................................ 264/157; 15/250.36; 264/235; 264/236
[58] Field of Search ..................... 15/250.36; 264/157, 264/235, 236, 346, 347

[56] References Cited

U.S. PATENT DOCUMENTS

| | | | |
|---|---|---|---|
| 3,035,297 | 5/1962 | Overmon | 15/250.36 X |
| 3,121,133 | 2/1964 | Mathues | 15/250.36 X |
| 3,882,567 | 5/1975 | Herzog | 15/250.36 |
| 3,997,935 | 12/1976 | Porter et al. | 15/250.36 |
| 4,045,838 | 9/1977 | Porter | 15/250.36 |

*Primary Examiner*—Thomas P. Pavelko
*Attorney, Agent, or Firm*—Eyre, Mann, Lucas & Just

[57] ABSTRACT

An improved windshield wiper blade is disclosed. At least the lip surface of a flexible windshield wiper blade is treated by heating at an elevated temperature. The treated blade exhibits substantially better wipe qualities than untreated blades.

17 Claims, No Drawings

HEAT TREATMENT OF WINDSHIELD WIPER BLADES

This is a continuation of application Ser. No. 815,521, filed July 14, 1977, now abandoned.

The present invention relates to windshield wiper blades and more particularly to the heat treating of the blades whereby wipe characteristics are improved.

It is well known by anyone who has driven a truck or an automobile, especially under so-called "misty" conditions, that the wipe of a windshield wiper blade is far from acceptable. It is further known that when a windshield wiper blade is used under these conditions for any period of time, it quickly wears at least with respect to any effective wipe which it gives. This will commonly result in streaking of the windshield.

There have been a myriad of attempts to improve windshield wiper blades by varying the blade holder design, the blade configuration, chemical treatment of the blade, and many other ways have also been tried to improve windshield wiper blades. However, none of these has been totally effective especially where the blade is frequently subjected to "misty" conditions.

In U.S. Pat. No. 3,997,935 of which I was a co-inventor, we disclosed the alkaline treatment of windshield wiper blades with a strong alkalai for improving wipe. In United States Patent Application No. 667,163 of which I was sole inventor I described the coating of a windshield wiper blade for improved wipe. While both of these methods are highly desirable, the search has continued for some means of treating windshield wiper blades with quite low cost and quite high improvement in wipe.

In accordance with the present invention, it has been found that heat treating of a windshield wiper blade at an elevated temperature and for a period of time will substantially improve the wipe properties of the blade. The heat treatment can be done in a variety of ways including irradiation, liquid bath, or an oven. It is not necessary that the entire wiper blade be heat treated and it is only necessary that the lip portion of the wiper blade be so treated.

Windshield wiper blades are ordinarily molded from a variety of elastomers including natural and synthetic rubbers. After the basic blade is formed, it is generally treated with a halogen, usually chlorine for the purpose of hardening the surface of the rubber in order to reduce friction of the wiper blade on the windshield and improve wear. Following this treatment the basic blade is sometimes graphited to further reduce friction. The basic blade is then ordinarily cut to form the wiper blade lip and the completed wiper blade element.

In accordance with the present invention, a wiper blade is first formed, suitably by molding or extruding. This wiper blade can be any elastomeric material such as natural or synthetic polyisoprene, butadiene, ethylene-propylenediene rubber, neoprene or the like or blends of the foregoing. In accordance with the present invention, the formed windshield wiper blade preferably comprises at least 50% polyisoprene, either natural or synthetic or a blend of the two.

After formation of the basic blade, the blade is preferably treated to reduce the coefficient of friction of the surface thereof. The surface of the basic windshield wiper blade either because of its inherent characteristics or because of treatment should have a coefficient of friction no greater than about 2.1 according to Friction Test CFRP 113 as defined in United States Patent Application No. 667,163, the pertinent part of which is hereby incorporated by reference. It is preferred that the coefficient of friction be no greater than about 1.5 according to the said test and best results are obtained when the coefficient of friction is about 1.0 or lower.

Friction Test CFRP 113 basically involves measuring the coefficient of friction of windshield wiper blades using a strain guaged wiper arm.

In some instances, e.g., neoprene, the coefficient of friction of the blade will be low enough in accordance with the present invention that no treatment to reduce surface friction is required. However, most blade materials will require some treatment in order to reduce surface friction. For typical windshield wiper blades such as those made of polyisoprene, halogenation with either chlorine or bromine, a very well known procedure is suitably employed, see for example U.S. Pat. No. 3,035,297. It is also possible to reduce the friction of the surface of blades by treatment with an inorganic acid such as nitric acid or sulfuric acid by employing a concentrated acid at room temperature for a relatively short period of time, e.g., two minutes.

Still another way to treat the surface of the formed blade to reduce friction is to apply a hard coating to the surface thereof. This is especially desirable with blades such as those made out of ethylene-propylene-diene rubber where halogenation is ineffective to increase surface hardness. These methods of depositing a hardened layer on the surface of a formed blade thereby to increase surface hardness of the blade are well known in the art, see for example U.S. Pat. No. 3,001,221 and British Patent Specification No. 1,090,162.

The blade of the present invention may be a conventional chlorinated blade, an untreated blade such as neoprene or even an untreated polyisoprene based blade. Furthermore, it has been found that alkaline treated blades according to U.S. Pat. No. 3,997,935 or coated blades according to United States Patent Application No. 667,163 may be advantageously treated according to the process of the present invention to get even better results than taught in said patents. However, for reasons of economy it is preferred that the present invention be used without any prior treatment step other than the standard chlorination where desired.

The blade may be formed to shape by molding or by extrusion or by other techniques and the blade lip edge may be formed either during molding or extrusion or, as well known in the art, the blade structure may be made "double" (joined at the lip) or multiple whereafter it is severed to form two or more separate blades with the cut edge being the lip edge. Such double and multiple windshield wiper blade structures are very well known in the art, see for example FIGS. 2 and 3 of U.S. Pat. No. 3,035,297. The treatment of the present invention is effective on all these types of blades. However, it is essential that the final lip edge be formed before the treatment of the present invention, i.e. if the blades are made "double" or "multiple" they must be severed before the treatment of the present invention is carried out. The necessity of this is demonstrated by the fact that where multiple wiper blade structures are heat treated according to the times and temperatures of the present invention and are cut after heat treating, they actually give many more streaks than non-heat treated blades made in the same manner. Interestingly, further heat treating after cutting improves the wipe of both lots of blades (see Example 2).

The formed blade of the present invention is heat treated to improve the wipe characteristics of the blade. The heat treatment is at a high enough temperature and for a sufficient period of time to reduce the streaks yielded by the blade in Wipe Test WT-1 as hereinafter discussed. In general and for most blades and in particular for polyisoprene based blades this will be a treatment temperature of from about 60° C. to about 160° C. for a period of time of from about 20 seconds to about 18 hours with the longer times being for the lower temperatures. Preferably the treatment is at a temperature of from about 80° C. to about 130° C. and for a time of from about 45 minutes to about 30 seconds and even more preferably at a temperature of from about 110° C. to 120° C. and for from about 10 minutes to about 45 seconds. Excellent results have been obtained at temperatures of 110°–120° C. for periods of 8–4 minutes.

It is pointed out that there is an upper limit to the amount of heat treating which may be done. As with the minimum amout of heat treating, the maximum also depends upon the composition of the particular blade being treated. In general it is believed that "excess" heat treating causes excessive hardening of the blade which makes it more difficult for it to "lay over" as it goes back and forth. This in turn results in a greater number of streaks (see especially Test numbers 2 and 3 in Example 1). However, it does not take much experimentation to determine the upper limit of heat treating for a particular blade and this is certainly easily within the skill of the art.

According to the present invention, the heat treatment is of at least the lip of the blade (i.e., the blade lip) but may also be applied to the entire blade if desired. In general it will be impractical to heat treat less than the entire blade but means for accomplishing this would certainly be readily known to those of ordinary skill in this art if problems, e.g. excessive stiffening of the blade whereby it would not "lay over", are encountered.

A number of examples were carried out to demonstrate the various aspects of the present invention. Except where otherwise indicated, a windshield wiper blade was used which composed of natural polyisoprene, zinc oxide, carbon black, sulfur as a vulcanizing agent and the usual accelerators, antioxidants, etc. These blades are typical of those commercially available. Except as otherwise specified in a particular Example, each blade was halogenated in known manner (see for example U.S. Pat. No. 3,035,297). After being brought to final shape by the method described in each example, each of the blades was then tested according to Wipe Test WT-1 whereafter the blade was heat treated in accordance with the present invention and was then tested again according to Wipe Test WT-1.

Wipe Test WT-1 is fully described in United States Patent Application No. 667,163 the pertinent part of which is hereby incorporated by reference. As there brought out, the test is carried out by allowing the wiper blade to traverse a wetted windshield one time in each direction. The number of streaks left by the wiper blade during the upstroke and downstroke portions of the wipe cycle are separately counted and added together to give the total number of streaks left in a complete wipe cycle. The WT-1 test results are given in each of the examples by absolute values or by comparison values.

It must be appreciated that there are very appreciable differences in wipe characteristics of different wiper blades. These differences are occasioned by the sharpness and type of cutter used in forming the blade lip, the particular uncontrollable conditions under which the blade is made, the age of the blade and other similar factors. Therefore, comparison of wipe characteristics can only be made within a particular example and no comparisons can be made with the wipe results of a different example.

EXAMPLE 1

In most instances in the industry today, wiper blades are made by compression molding as "double" blades and are then cut with a rotary shear cutter along the blade lip to separate the blades. The first group of tests involved blades of the general composition above specified cut with a rotary shear cutter. In some cases a particular blade was tested, heat treated and then tested again whereafter it was subsequently heat treated a second time and retested. In Table I, the time indicated for heat treatment is the total aggregate time. For example, in Test #1 the blade was tested and found to give 32 streaks. It was then heat treated at 130° C. for 2 minutes which reduced the streaks to 10. It was then further heat treated for an additional 3 minutes (total of 5 minutes) which reduced the streaks to 7. It was finally heat treated for an additional 5 minutes (total of 10 minutes) whereafter it gave only 3 streaks. The results of the test are shown in Table I.

TABLE I

| Test # | Initial # of Streaks (WT-1) | Heat Treatment Temp. C.° | Heat Treatment Time (Mins) | Streaks After Treatment (WT-1) |
|---|---|---|---|---|
| 11 | 32 | 130 | 2 | 10 |
|  |  |  | 5 | 7 |
|  |  |  | 10 | 3 |
| 12 | 23 | 120 | 5 | 0 |
|  |  |  | 10 | 3 |
| 13 | 30 | 120 | 2 | 7 |
|  |  |  | 10 | 17 |
| 14 | 17 | 120 | 10 | 7 |
| 15 | 15 | 110 | 5 | 7 |
| 16 | 12 | 110 | 10 | 2 |
| 17 | 12 | 110 | 20 | 0 |
| 18 | 8 | 80 | 75 | 3 |
|  |  |  | 285 | 3 |
| 19 | 10 | 80 | 75 | 3 |

Some of the test results shown in Table I (see especially Test #13) indicate that heat treating for too long, while still beneficial, may not be as beneficial as heating for a lesser period. While the exact reason for this is not known, it is believed, as earlier pointed out, that it may be caused by overcuring of the blade which results in less "lay over" during the wiping cycle.

EXAMPLE 2

This example is intended to show that heat treating before cutting does not yield any benefit in accordance with the present invention. In each case the blade was heat treated and then cut and measured for streaks. Test numbers 21 and 25 demonstrate that heat treating before cutting does not hurt, however, since heat treating after cutting even of blades which had been heat treated before cutting still gave improved results as compared to untreated blades. In this example, all blades were taken from the same lot. This lot of blades was found to give an initial number of streaks of about 25 if there was no treatment at all. The results of the test are shown in Table II.

TABLE II

| Test # | Temp °C | Time (Mins) | Streaks: Heat Treatment Followed By Cutting | Heat Treatment After Cutting Temp °C | Time (Mins) | Streaks After Treatment |
|---|---|---|---|---|---|---|
| 21 | 130 | 5 | Innumerable | 130 | 5 | 5 |
| 22 | 120 | 5 | 55 | | | |
| 23 | 120 | 10 | 74 | | | |
| 24 | 110 | 5 | 29 | | | |
| 25 | 110 | 20 | 40 | 110 | 10 | 8 |
|    |     |    |    |     | 20 | 7 |
| 26 | 110 | 10 | 31 | | | |

EXAMPLE 3

In order to test the effect of heat treatment on wear properties, a standard double blade as above identified was cut on a rotary cutter and was then heat treated at 120° C. for 10 minutes. The wiper blade was then cycled in a standard windshield wiper mechanism against a dry windshield for a total of 30,000 cycles. At the end of the test there was no visible build up of rubber on the windshield thus demonstrating that heat treating did not destroy the wear characteristics of the blade.

EXAMPLE 4

Some wiper blades made today are made by compression molding and then cutting with a draw knife (e.g. a razor blade) rather than with a rotary cutter. Tests were conducted on compression molded blades cut with a draw knife and then heat treated in accordance with the present invention. In each case the cut blade was treated at 120° C. for 8 minutes. The results of the tests are shown in Table IV. (There is no Table III.)

TABLE IV

| Test # | Initial # of Streaks | Streaks After Treatment |
|---|---|---|
| 41 | 11 | 3 |
| 42 | 20 | 18 |
| 43 | 8 | 3 |
| 44 | 25 | 27 |
| 45 | 28 | 15 |
| 46 | 15 | 12 |
| 47 | 7 | 5 |
| 48 | 13 | 7 |
| 49 | 11 | 3 |
| 50 | 13 | 9 |

While the results of the tests were not as dramatic as with the blades cut with the rotary cutter, the fact remains that in all but one case (Test #44) there was an improvement in wipe. Whether the results of Test #44 were due to some defect in the blade, tester error or other factor could not be determined since it was, of course, not possible to rerun the test once it had been heat treated.

EXAMPLE 5

Another process used in the formation of windshield wiper blades is extrusion (rather than compression molding). In order to demonstrate the effect of the present invention on extruded blades, a number of extruded double blades were cut with a rotary shear cutter, and were then tested for streaks. Thereafter the blades were heat treated at 120° C. for 8 minutes and were then tested again for streaks. The results of the foregoing tests are shown in Table V.

TABLE V

| Test # | Initial # of Streaks | Streaks After Treatment |
|---|---|---|
| 51 | 8 | 2 |
| 52 | 16 | 8 |
| 53 | 8 | 9 |
| 54 | 30 | 15 |
| 55 | 11 | 3 |
| 56 | 12 | 13 |
| 57 | 11 | 7 |
| 58 | 26 | 14 |

As can be seen from the results of the above tests, in all but two instances (Tests 53 and 56) treatment according to the present invention showed an improvement in wipe. With respect to Tests 53 and 56, the same comments apply as with Test 44 in Example 4.

EXAMPLE 6

Windshield wiper blades are, in some instances, directly molded or extruded with the lip edge being formed during the formation of the blade rather than being formed thereafter by cutting. This process is not widely used because the resulting blades are considered to be inferior. However, a number of blades with the lip edge directly molded were tested for number of streaks whereafter they were heat treated in accordance with the present invention and were then retested for number of streaks. The results of the tests are shown in Table VI.

TABLE VI

| Test # | Initial # of Streaks | Streaks After Treatment |
|---|---|---|
| 61 | 114 | 28 |
| 62 | 83 | 53 |

It can thus be seen that the advantages of the present invention are obtained even where there is no cutting of the blade lip.

In the foregoing examples the primary comparison has been on the basis of number of streaks left when measured according to Wipe Test WT-1. In addition to reducing streaks, the treatment of the present invention has also been observed to give better wipe in terms of two other phenomena, patching and haziness. While these exact terms may not be familiar to everyone of skill in the art, the phenomena themselves certainly are. It has been found that the heat treatment of the present invention gives a modest improvement in patches of water left by the blades (generally at the holder claw positions) and that the general haziness of the wipe produced by the blades is also decreased.

While various examples of treatments according to the present invention are presented herein before, it will be understood that the claims are intended to cover all changes and modifications of the preferred embodiments of the invention, herein chosen for the purpose of illustration, which do not constitute departures from the spirit and scope of the invention.

What is claimed is:

1. A process of making an improved flexible windshield wiper blade from a double windshield wiper blade of two windshield wiper blades joined at their lips comprising severing the wiper blades to separate them and form the lip edge and thereafter dry heat treating at least the lip of one separated wiper blade, the heat treatment being at a temperature of from about 60° C. to about 160° C. for a period of time from about 18 hours to about 30 seconds.

2. The process of claim 1 wherein the heat treatment is at a temperature of from about 80° C. to about 130° C. and the time of treatment is from about 45 minutes to about 1 minute.

3. The process of claim 1 wherein the heat treatment is at a temperature of from about 110° C. to about 120° C. and the time of treatment is from about 8 minutes to about 4 minutes.

4. The process of claim 1 wherein the double windshield wiper blade is formed by compression molding.

5. The process of claim 1 wherein the severing is done with a rotary shear cutter.

6. The process of claim 1 wherein the severing is done with a draw knife.

7. The process of claim 1 wherein the double windshield wiper blade is formed by extrusion.

8. A process of making an improved flexible windshield wiper blade from a double windshield wiper blade of two windshield wiper blades joined at their lips comprising severing the wiper blades to separate them and form the lip edge and thereafter heat treating at least the lip of one separated wiper blade, the heat treatment being at a temperature of from about 110° C. to about 120° C. and the time of treatment being from about 10 minutes to about 45 seconds.

9. A process of making an improved flexible windshield wiper blade from a multiple windshield wiper blade structure of at least two windshield wiper blades joined together, comprising severing the wiper blades to separate them and form the lip edge and thereafter dry heat treating at least the lip of one separated wiper blade, the heat treatment being at a temperature of from about 60° C. to about 160° C. for a period of time from about 18 hours to about 30 seconds.

10. The process of claim 9 wherein the heat treatment is at a temperature of from about 80° C. to about 130° C. and the time of treatment is from about 45 minutes to about 1 minute.

11. The process of claim 9 wherein the heat treatment is at a temperature of from about 110° C. to about 120° C. and the time of treatment is from about 8 minutes to about 4 minutes.

12. The process of claim 9 wherein the severing is done with a rotary shear cutter.

13. The process of claim 9 wherein the windshield wiper blade is formed by extrusion.

14. A process of making an improved flexible windshield wiper blade from a multiple windshield wiper blade structure of more than two windshield wiper blades joined together, comprising severing the wiper blades to separate them and form the lip edge and thereafter heat treating at least the lip of one separated wiper blade, the heat treatment being at a temperature of from about 110° C. to about 120° C. and the time of treatment being from about 10 minutes to about 45 seconds.

15. A process of making an improved flexible windshield blade comprising forming a plurality of blades joined together at their lips, severing the lip of each blade from the other blades, dry heat treating of at least the lip of a windshield wiper blade whose lip edge is in its final shape before the heat treatment, said heat treatment being at a temperature and for a time effective to reduce the number of streaks of the heat treated blade as compared to the same blade which has not been heat treated when each is tested in Wipe Test WT-1.

16. A process of making an improved flexible windshield wiper blade from a double windshield wiper blade of two windshield wiper blades joined at their lips comprising severing the wiper blades to separate them and form the lip edge and thereafter heat treating the separated windshield wiper blade in a liquid bath at a temperature of from about 110° C. to about 160° C. for a period of time effective to improve the wipe of the blade.

17. A process of making an improved flexible windshield wiper blade comprising forming a plurality of blades joined together at their lips, severing the lip of each blade from the other blades, heat treating of at least the lip of a windshield wiper blade whose lip edge is in its final shape before the heat treatment, said heat treatment being in a liquid bath and at a temperature and for a time effective to reduce the number of streaks of the heat treated blade as compared to the same blade which has not been treated when each is tested in Wipe Test WT-1, the temperature being at least about 110° C.

* * * * *